(12) United States Patent
Jones et al.

(10) Patent No.: US 8,798,366 B1
(45) Date of Patent: Aug. 5, 2014

(54) ELECTRONIC BOOK PAGINATION

(75) Inventors: Derek T. Jones, Bainbridge Island, WA (US); Oleksandr Y. Berezhnyy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 331 days.

(21) Appl. No.: 12/979,971

(22) Filed: Dec. 28, 2010

(51) Int. Cl.
*G06K 9/34* (2006.01)

(52) U.S. Cl.
USPC .......................................................... 382/177

(58) Field of Classification Search
CPC .................................................. G06F 17/217
See application file for complete search history.

(56) References Cited

U.S. PATENT DOCUMENTS

| | | | | |
|---|---|---|---|---|
| 4,884,974 A | * | 12/1989 | DeSmet | 434/317 |
| 5,166,664 A | * | 11/1992 | Fish | 340/539.22 |
| 5,802,204 A | * | 9/1998 | Basehore | 382/186 |
| 5,907,845 A | | 5/1999 | Cox et al. | |
| 5,960,464 A | * | 9/1999 | Lam | 711/206 |
| 5,986,690 A | | 11/1999 | Hendricks | |
| 6,047,093 A | * | 4/2000 | Lopresti et al. | 382/310 |
| 6,108,688 A | * | 8/2000 | Nielsen | 709/206 |
| 6,138,129 A | * | 10/2000 | Combs | 1/1 |
| 6,173,251 B1 | * | 1/2001 | Ito et al. | 704/7 |
| 6,218,982 B1 | * | 4/2001 | Shirai et al. | 342/118 |
| 6,377,945 B1 | * | 4/2002 | Risvik | 1/1 |
| 6,622,624 B1 | * | 9/2003 | Divine et al. | 101/484 |
| 6,658,626 B1 | * | 12/2003 | Aiken | 715/205 |
| 6,704,733 B2 | | 3/2004 | Clark et al. | |
| 6,898,307 B1 | * | 5/2005 | Harrington | 382/154 |
| 7,020,654 B1 | | 3/2006 | Najmi | |
| 7,020,663 B2 | * | 3/2006 | Hay et al. | 434/317 |
| 7,028,258 B1 | * | 4/2006 | Thacker et al. | 715/209 |
| 7,702,655 B1 | * | 4/2010 | Panelli et al. | 707/600 |
| 7,823,127 B2 | * | 10/2010 | Zeidman | 717/123 |
| 8,250,065 B1 | * | 8/2012 | Chambers et al. | 707/723 |
| 8,266,115 B1 | | 9/2012 | Park et al. | |
| 8,280,640 B2 | * | 10/2012 | Levin et al. | 702/19 |
| 8,316,032 B1 | | 11/2012 | Baluja et al. | |
| 8,495,061 B1 | | 7/2013 | Lifantsev | |
| 8,510,312 B1 | | 8/2013 | Thibaux et al. | |
| 2002/0021838 A1 | * | 2/2002 | Richardson et al. | 382/181 |
| 2002/0049781 A1 | * | 4/2002 | Bengtson | 707/500.1 |
| 2002/0091584 A1 | | 7/2002 | Clark et al. | |
| 2002/0107735 A1 | * | 8/2002 | Henkin et al. | 705/14 |
| 2003/0032010 A1 | | 2/2003 | Selifonov et al. | |
| 2003/0093427 A1 | | 5/2003 | Hsu et al. | |
| 2003/0103238 A1 | * | 6/2003 | MacLean et al. | 358/1.18 |

(Continued)

OTHER PUBLICATIONS

Wikipedia, Lookup Table, published on Dec. 21, 2009, http://en.wikipedia.org/w/index.php?title=Lookup_table&oldid=333018082.*

(Continued)

*Primary Examiner* — Bhavesh Mehta
*Assistant Examiner* — Feng Niu
(74) *Attorney, Agent, or Firm* — Lee & Hayes, PLLC

(57) ABSTRACT

An electronic book can be paginated by reference to a print version of the same book. Pages of the print version are scanned to obtain text strings and page labels corresponding to each of the pages. The text strings are then compared to the electronic book to find the best matching positions within the electronic book. The matching positions within the electronic book are then associated with the page numbers of the pages from which the matching text strings were obtained. Autocorrelation can be used to determine matching positions.

29 Claims, 6 Drawing Sheets

(56) References Cited

U.S. PATENT DOCUMENTS

| | | |
|---|---|---|
| 2004/0068471 A1 | 4/2004 | Kato |
| 2004/0088165 A1* | 5/2004 | Okutani et al. ............... 704/260 |
| 2004/0205540 A1 | 10/2004 | Vulpe et al. |
| 2004/0218205 A1* | 11/2004 | Irwin et al. ................... 358/1.15 |
| 2005/0060273 A1* | 3/2005 | Andersen et al. ................. 707/1 |
| 2005/0096938 A1 | 5/2005 | Slomkowski et al. |
| 2005/0097007 A1 | 5/2005 | Alger et al. |
| 2005/0131932 A1 | 6/2005 | Weare |
| 2005/0138551 A1* | 6/2005 | Elazar et al. ................. 715/525 |
| 2005/0190397 A1* | 9/2005 | Ferlitsch .................... 358/1.15 |
| 2005/0192955 A1 | 9/2005 | Farrell |
| 2005/0196074 A1* | 9/2005 | Deere .......................... 382/305 |
| 2005/0198070 A1 | 9/2005 | Lowry |
| 2005/0209989 A1 | 9/2005 | Albornoz et al. |
| 2006/0036593 A1 | 2/2006 | Dean et al. |
| 2006/0150096 A1* | 7/2006 | Thacker et al. ............... 715/525 |
| 2006/0156226 A1* | 7/2006 | Dejean et al. ................. 715/517 |
| 2006/0173818 A1 | 8/2006 | Berstis et al. |
| 2006/0262340 A1* | 11/2006 | Lee .............................. 358/1.14 |
| 2006/0277167 A1* | 12/2006 | Gross et al. ....................... 707/3 |
| 2007/0061582 A1* | 3/2007 | Ohmori et al. ................ 713/176 |
| 2007/0150443 A1 | 6/2007 | Bergholz et al. |
| 2007/0217692 A1* | 9/2007 | Newcomer et al. ........... 382/229 |
| 2007/0217715 A1* | 9/2007 | Newcomer et al. ........... 382/305 |
| 2007/0274704 A1* | 11/2007 | Nakajima et al. ............. 396/310 |
| 2007/0280072 A1* | 12/2007 | Hsieh et al. ................ 369/47.25 |
| 2007/0286465 A1* | 12/2007 | Takahashi et al. ............ 382/125 |
| 2008/0019430 A1* | 1/2008 | Suzuki et al. ................. 375/150 |
| 2008/0077570 A1 | 3/2008 | Tang et al. |
| 2008/0114757 A1* | 5/2008 | Dejean et al. ..................... 707/6 |
| 2008/0126335 A1* | 5/2008 | Gandhi et al. .................... 707/5 |
| 2008/0154943 A1* | 6/2008 | Dreyer et al. ................. 707/102 |
| 2008/0163039 A1* | 7/2008 | Ryan et al. .................... 715/206 |
| 2008/0209314 A1* | 8/2008 | Sylthe et al. .................. 715/273 |
| 2008/0229182 A1 | 9/2008 | Hendricks et al. |
| 2008/0275871 A1 | 11/2008 | Berstis et al. |
| 2008/0294453 A1* | 11/2008 | Baird-Smith et al. ............. 705/1 |
| 2009/0012984 A1 | 1/2009 | Ravid et al. |
| 2009/0027419 A1* | 1/2009 | Kondo et al. .................. 345/649 |
| 2009/0049026 A1* | 2/2009 | Ohguro ............................. 707/4 |
| 2009/0144277 A1* | 6/2009 | Trutner et al. .................... 707/6 |
| 2009/0164312 A1* | 6/2009 | Nadig ............................. 705/14 |
| 2009/0182728 A1* | 7/2009 | Anderson ......................... 707/5 |
| 2009/0204893 A1* | 8/2009 | Nguyen et al. ................ 715/251 |
| 2009/0241054 A1 | 9/2009 | Hendricks |
| 2009/0254810 A1* | 10/2009 | Mitsui .......................... 715/234 |
| 2009/0265321 A1 | 10/2009 | Grubb et al. |
| 2009/0310408 A1* | 12/2009 | Lee et al. ................. 365/185.03 |
| 2009/0313539 A1* | 12/2009 | Ota et al. ...................... 715/255 |
| 2009/0324096 A1* | 12/2009 | Megawa ....................... 382/206 |
| 2010/0114827 A1 | 5/2010 | Pearce |
| 2010/0166309 A1 | 7/2010 | Hull et al. |
| 2010/0198864 A1 | 8/2010 | Ravid et al. |
| 2010/0220216 A1* | 9/2010 | Fishman et al. ......... 348/231.99 |
| 2010/0251089 A1* | 9/2010 | Cole et al. ..................... 715/212 |
| 2011/0078152 A1* | 3/2011 | Forman et al. ................ 707/747 |
| 2011/0153330 A1 | 6/2011 | Yazdani et al. |
| 2012/0036431 A1 | 2/2012 | Ito et al. |
| 2012/0121195 A1* | 5/2012 | Yadid et al. ................... 382/229 |
| 2012/0198330 A1* | 8/2012 | Koppel et al. ................. 715/251 |

OTHER PUBLICATIONS

Wikipedia, Metadata, published on Dec. 23, 2009, http://en.wikipedia.org/w/index.php?title=Metadata&oldid=333583065.*

Office action for U.S. Appl. No. 13/050,829, mailed on Nov. 29, 2012, Hamaker et al.,"Aligning Content Items to Identify Differences", 24 pages.

Non-Final Office Action for U.S. Appl. No. 13/050,829, mailed on May 8, 2012, Janna Hamaker et al., "Aligning Content Items to Identify Differences", 20 pages.

Office action for U.S. Appl. No. 13/048,426, mailed on Apr. 1, 2013, Weight et al., "Identifying Book Title Sets", 23 pages.

Office action for U.S. Appl. No. 12/980,015, mailed on Sep. 10, 2013, Weight et al., "Book Version Mapping", 27 pages.

Office action for U.S. Appl. No. 13/048,426, mailed on Nov. 18, 2013, Weight, et al., "Identifying Book Title Sets", 18 pages.

* cited by examiner

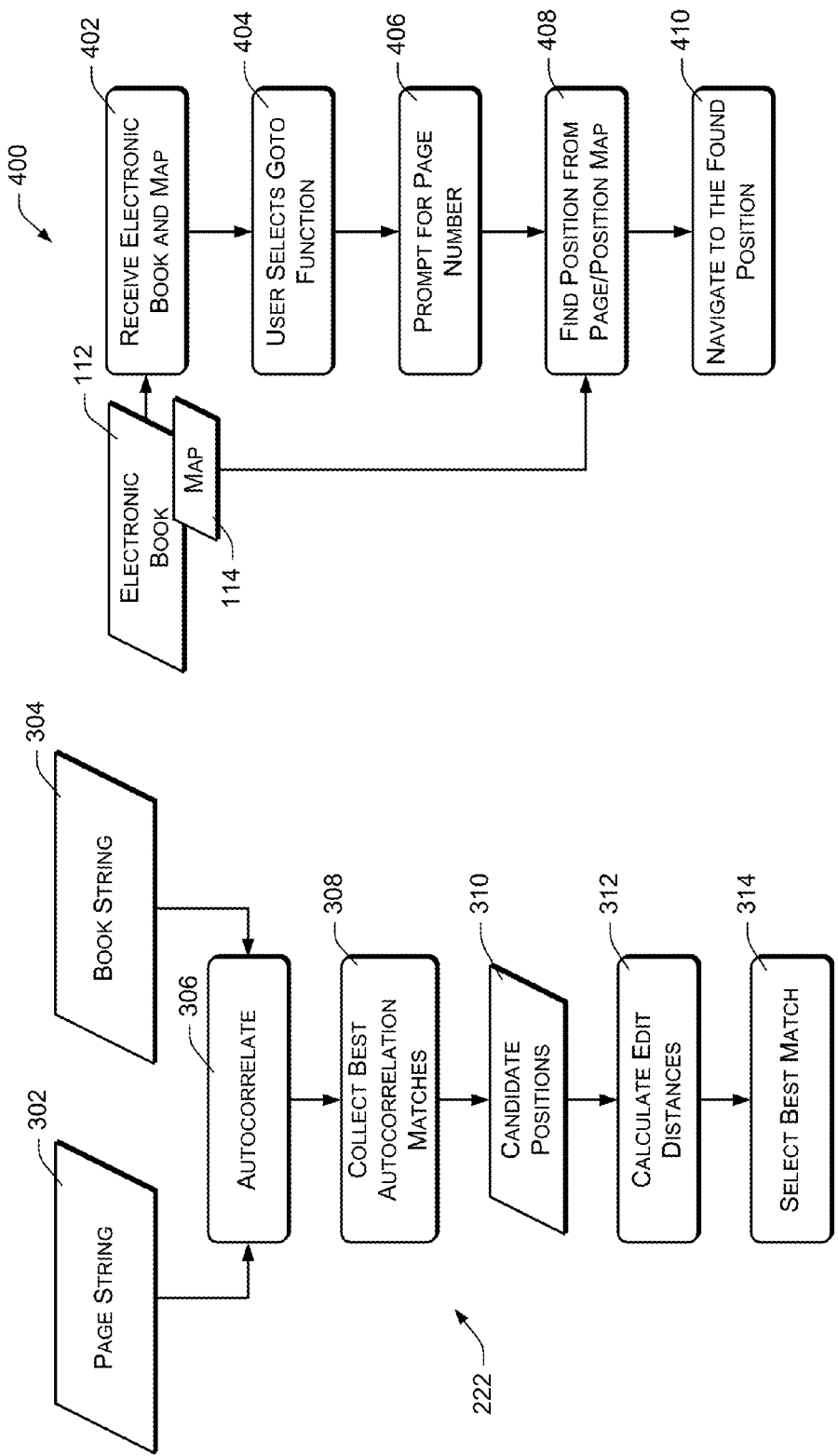

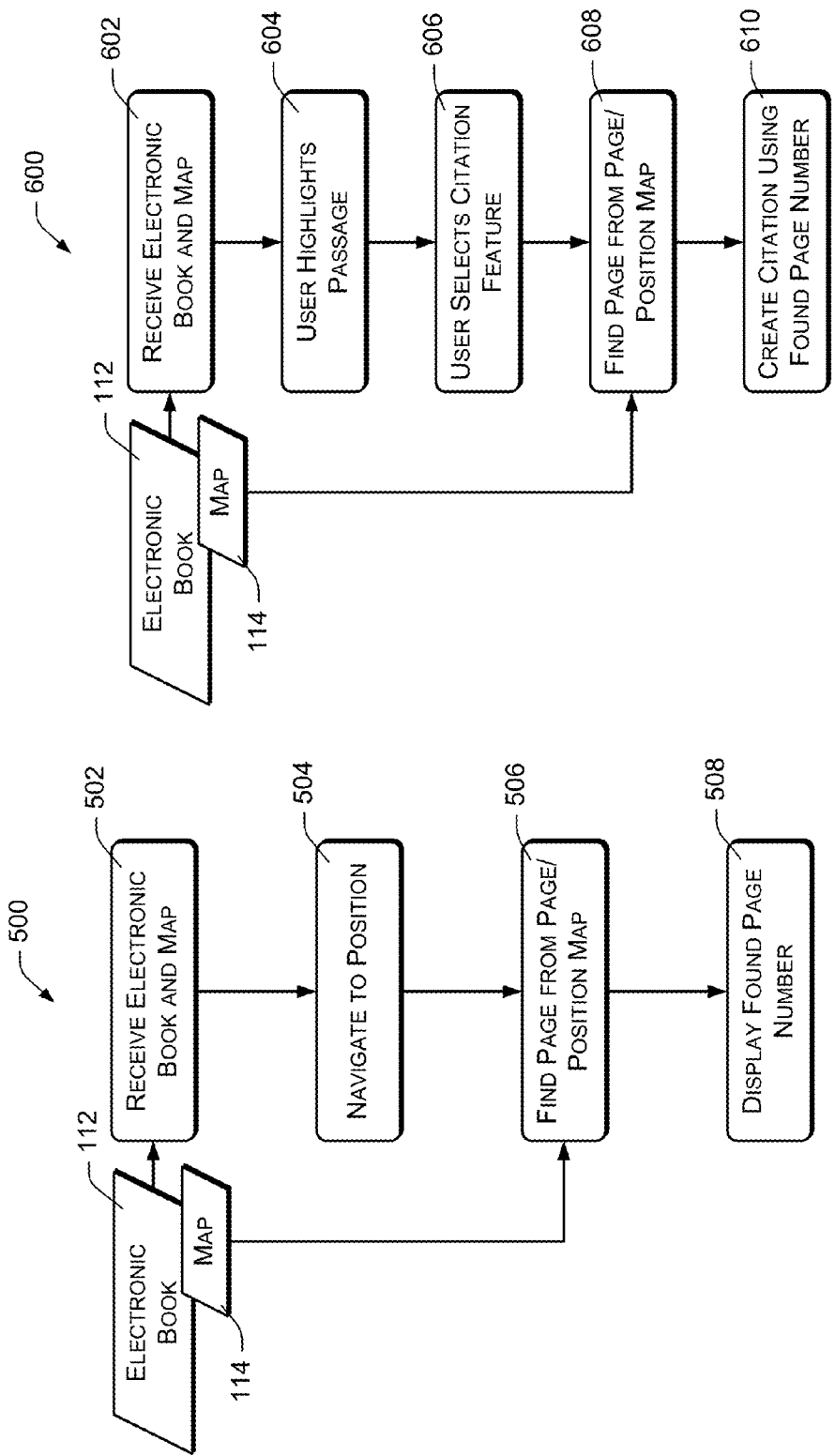

ELECTRONIC BOOK PAGINATION

BACKGROUND

Locations within books have traditionally been indicated by page numbers. However, the concept of a "page" is not as meaningful in the context of electronic books, in which page divisions may be calculated dynamically as a function of page and font size. Different book reader devices have different display sizes, and even within a particular device a user may change viewing options to result in different effective page sizes.

Because of this, electronic books are often submitted for publication without any indications of page numbering. Within electronic books such as these, locations are often referenced in terms of an index that relates to a smaller unit of measure, such as by a byte/character offset or a word offset. For example, a particular word might be specified in terms of its starting and ending byte or character indexes, relative to the beginning of the electronic book. However, this can result in confusion when trying to cite from particular locations within electronic books, and when trying to navigate to particular locations within electronic books.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3 is a flow diagram of an illustrative process using autocorrelation and edit distances to determine positions within an electronic book corresponding to pages of a print version of the electronic book.

FIGS. 4-6 are flow diagrams illustrating different ways in which an electronic reader might utilize pagination information generated as a result of the processes of FIGS. 2 and 3.

DETAILED DESCRIPTION

This disclosure describes systems, devices, and techniques in which electronic books can be efficiently paginated to match the paginations of printed versions of the same books.

Electronic books are often submitted for publication in a digital format that does not include or indicate page numbering. As mentioned above, it is possible to specify locations within electronic books, but such locations are often specified in terms of byte, character, or word offsets. There is often no way to correlate these offsets with the page numbering of equivalent printed versions of the electronic books.

In certain embodiments, a printed version of an electronic book is imaged or scanned, resulting in an image corresponding to each page of the printed version. The individual page images are then processed by optical character recognition (OCR) techniques, manually, or otherwise, to obtain the text from each page, including the page label associated with each page.

The text from each page can then be compared with the text of the electronic book to find the position of the page within the electronic book. Once this location is found, the page label associated with the printed version of the page is assigned to the found position within the electronic book. This association may be implemented by a page/position map that accompanies or is incorporated with the electronic book, and that cross references between page numbers and an electronic position index such as character count. Alternatively, the digital formatting of the electronic book can be modified to indicate page numbering at different locations within the electronic book.

When a user is reading an electronic book, this information may be referenced to determine the number of the currently displayed page, and may also be used to allow navigation by the user within the electronic book by page numbers that correspond to the page numbers used in printed versions of the book.

Example Architecture

Figure 1:
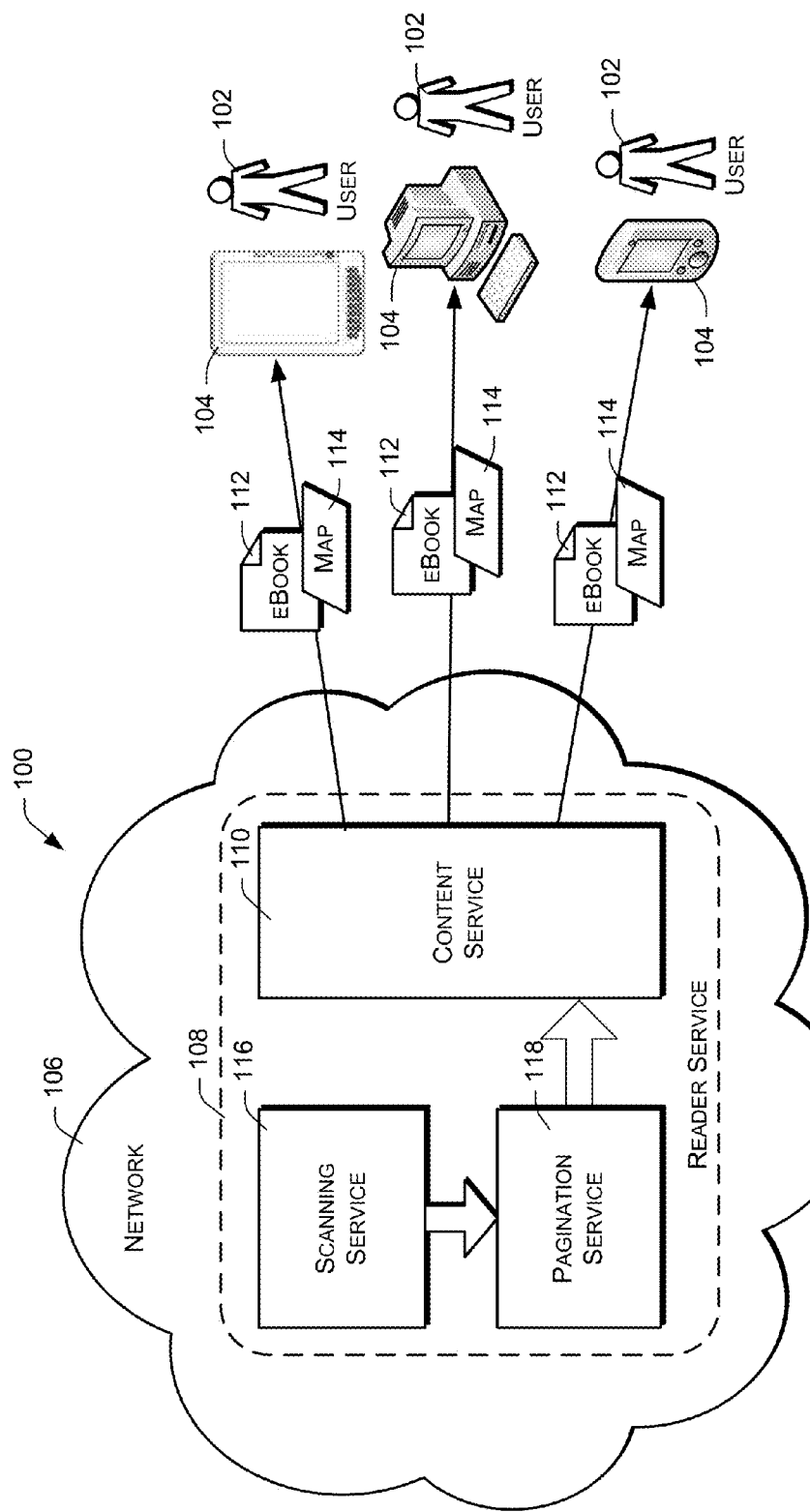
FIG. 1 is a block diagram illustrating a pagination service and other services that might be used in conjunction with the pagination service.

FIG. 1 shows an online environment 100 in which pagination services may be provided. The online environment 100 includes a plurality of users 102, each of which has or is associated with an electronic book reader 104 (also referred to herein as an electronic reader). Although FIG. 1 illustrates three users 102 and book readers 104, the described techniques can of course be used with any number of users and electronic book readers. In addition, a single user 102 may use a plurality of electronic book readers 104.

Each electronic reader 104 has a display upon which electronic content such as electronic books (eBooks) may be rendered. The terms content, content item, and "eBook" include essentially any form of electronic data that may be consumed on a device, including textual and verbal works comprising sequences of words such as digital books, audio books (which may also include video), electronic magazines, papers, journals, periodicals, documents, instructional materials, course content, and so on.

The electronic readers 104 may be handheld devices or other small, light-weight, portable devices upon which eBooks and other content can be rendered and conveniently viewed in a manner similar to viewing a paper book. Examples of handheld electronic readers include flat form-factor devices such as tablets, pads, smartphones, personal digital assistants (PDAs), etc.

In some embodiments, the electronic readers 104 may comprise dedicated-purpose eBook reader devices, having flat-panel displays and other characteristics that mimic the look, feel, and experience offered by paper-based books. For example, such eBook reader devices may have high-contrast flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, the electronic readers 104 have networking capabilities. For example, the electronic readers 104 may have wireless communication interfaces that allow communication though a network 106. The wireless communications interfaces may utilize WiFi, cellular, or other wireless data and networking technologies.

The network 106 may be any type of communication network, including a local-area network, a wide-area network, the Internet, a wireless network, a wide-area network (WWAN), a cable television network, a telephone network, a cellular communications network, combinations of the foregoing, etc. Services, sometimes referred to as "cloud-based" services, may be provided from the network 106. In FIG. 1, the network 106 is represented as a cloud, and network-based or cloud-based services relevant to this discussion are shown as blocks within the cloud.

In the described embodiment, the electronic readers 104 include nonvolatile storage capabilities so that electronic content items can be downloaded and stored in their entirety on the electronic readers. Once an eBook has been stored by an electronic reader, it can be displayed and read at any time, whether or not the electronic reader is connected to a network.

In the configuration illustrated by FIG. 1, the electronic readers 104 may obtain content items from an online reader service 108. The reader service 108 may be accessed using the networking capabilities of the electronic readers 104. The reader service 108 may be accessible through other means as well, such as by connection to intermediary devices like personal computers, different types of mobile devices, and so forth.

In FIG. 1, the reader service is illustrated as a network-based or cloud-based service, available over a public network such as the Internet. The electronic readers 104 may be configured to allow the users 102 to conveniently browse for content and content items from the reader service 108, and to purchase and download selected content items from the reader service 108.

Various applications and user interfaces may be used in conjunction with the electronic readers 104 to interact with the reader service 108, such as Internet browser programs that allow a user to interactively engage different online services. In addition, the reader service 108 may expose lower-level interfaces or APIs (application programming interfaces) through the network 106, through which devices and programs can access the underlying functionality of the reader service 108 without direct user interaction. For example a user may interactively purchase an eBook or other content item using a personal computer or some device other than the electronic reader device 104. The electronic reader 104 may periodically communicate with the reader service 108 to perform background synchronization or other housekeeping, and may automatically (without specific user intervention) download any content that has been purchased.

The reader service 108 might be implemented in some embodiments by an online merchant or vendor. Electronic books and other electronic content might be submitted in electronic or digital formats by various publishers, and subsequently offered for sale by the online merchant or vendor, or might be available to members or subscribers for some type of periodic or one-time fee. In some circumstances, eBooks or other content might be made available without charge.

As noted above, the electronic or digital formats used by publishers for content submission may contain no page numbering, and in particular may not indicate any correspondence between positions within the electronic content and corresponding pages of equivalent paper-based content.

FIG. 1 shows a configuration in which the reader service 108 is implemented as a number of functional components, illustrated as blocks within the larger dashed block representing reader service 108. These functional components, which will be described in more detail below, may be implemented and provided by way of a single installation and/or service provider, or may exist as independent services that communicate with each other using various means. Note that the illustrated configuration represents a logical organization of services, and is intended to facilitate description and explanation. However, the functionality and services represented in FIG. 1 may be implemented in many different ways, with various different divisions of responsibilities.

In the described embodiment, the reader service 108 includes a content service 110 through which the electronic readers 104 and other clients may interact with the reader service 108. The content service 110 may include a virtual storefront or other type of online interface for interaction with consumers and/or devices. The content service 110 may expose a graphical, web-based user interface that can be accessed by human users to browse and obtain (e.g., purchase, rent, lease, etc.) content items such as eBooks. The content service may also expose programmatic interfaces or APIs that entities and devices can use to obtain digital content items and related services.

The content service 110 may be used to provide eBooks and related data to users 102 via their electronic readers 104. FIG. 1 shows an eBook 112 being delivered to each electronic reader 104. Associated with each eBook 112 is a page/position map 114, which cross-references between page numbers and positions within the electronic books. As mentioned above, the electronic formats of eBooks may specify positions using various indices, such as character count, byte count, word count, and so on. The page/position map 114 allows translation between page numbers and these other types of indices.

As a simplified example, a page/position map may contain data similar to the following:

| Page Label | Character Index |
|---|---|
| i | 34 |
| ii | 180 |
| 1 | 300 |
| 2 | 478 |
| 3 | 632 |
| 4 | 789 |
| 5 | 940 |

In example above, a page/position map has a first column containing the page labels extracted from a printed version of a book, and a second column indicating the corresponding character indexes within the electronic version of the book. Different formats may of course be utilized to convey similar information. For example, one format may group sequential ranges of page labels, indicating the starting label of each range and the starting index of each sequential page within the range. When using this format, it is assumed that each indexed location within a range corresponds to a subsequently ordered page label, and only the first label of the range is explicitly specified. Different types of labels, such as roman numerals and Arabic numerals, can be specified by different ranges.

This information or similar information can be incorporated within the file format of the electronic books themselves, rather than conveyed by means of an associated data object as shown here. Also note that pages having no labeling may also be represented in these data formats or objects.

In the described embodiment, the reader service 108 implements a scanning service 116 and a pagination service 118 in order to provide the page/position maps 114. The functions and general operations of these services will be described with reference to subsequent figures.

Page-to-Position Mapping

Figure 2:
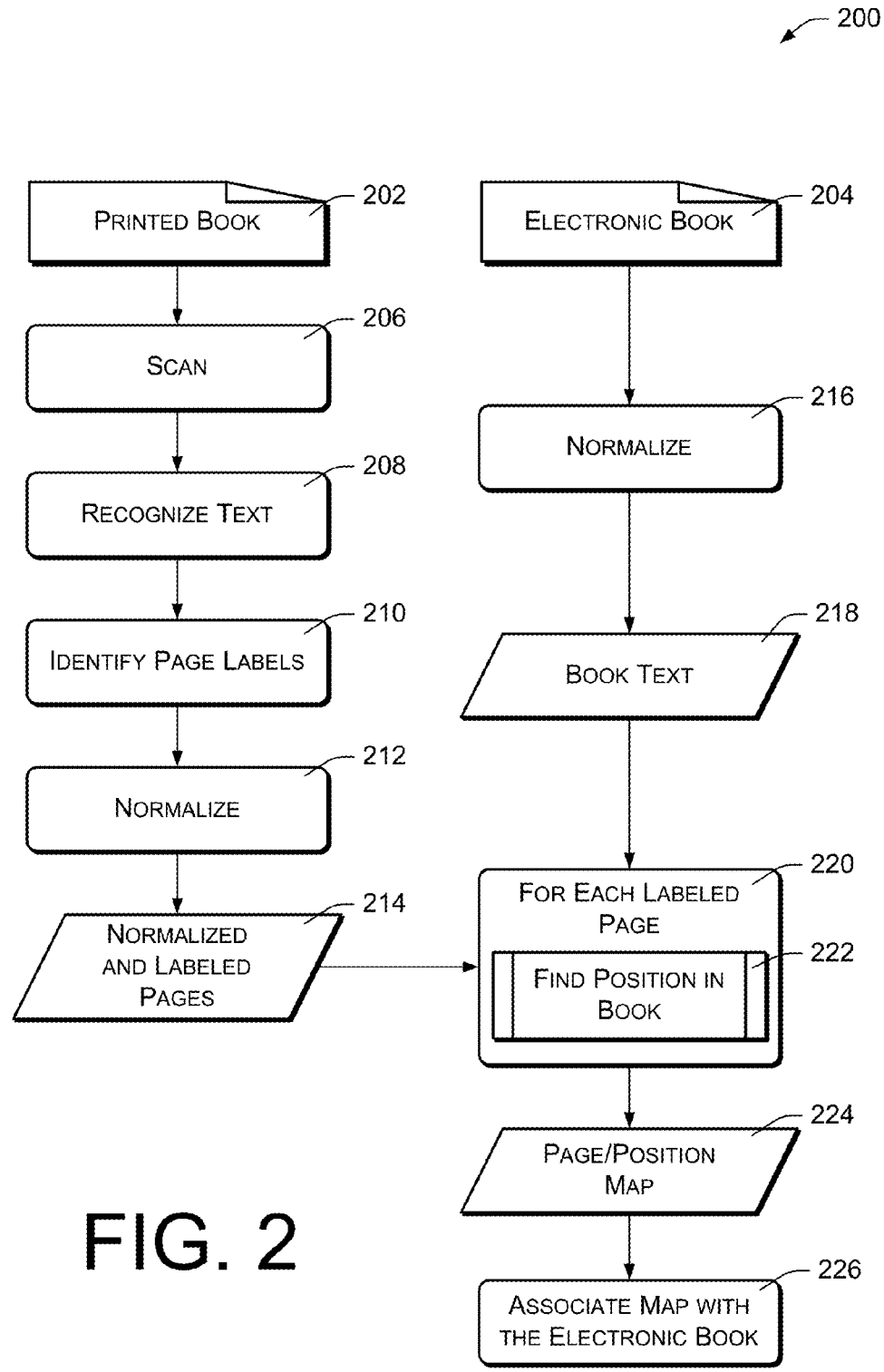
FIG. 2 is a flow diagram of an illustrative process paginating an electronic book in accordance with the page numbering of a print version of the electronic book.

FIG. 2 shows example implementations of processes performed by the scanning service 116 and the pagination service 118. Actions performed by the scanning service 116 are shown on the left. Actions performed by the pagination service 118 are shown on the right.

This example assumes the existence of a printed version of a book, designated by reference numeral 202, and a corresponding electronic version of the same book, designated by reference numeral 204. The printed book 202 and the electronic book 204 contain generally the same content, and are therefore considered versions of the same book. However, there may be significant differences between the two versions. One version, for example, may contain small revisions such as typographical corrections. More significantly, one version may contain different front or rear matter than the other. In some cases, one version may include significant revisions, such as insertion or deletion of entire sentences, paragraphs, chapters, introductions, forwards, afterwards, appendices, indexes, tables of contents, etc.

The printed book 202 is processed by the scanning service 116 as shown on the left side of FIG. 2. At 206, the printed book 202 is scanned. This can be performed using existing machine-based or manual processes, and involves capturing images of the individual physical pages of the printed book 202.

At 208, the scanning service 116 recognizes the text of the individual pages of scanned images. This may be performed using machine-based OCR techniques or other techniques, including the use of human analysts. This results in a text string corresponding to each page of the printed book 202. The text string may contain both body text and margin text. Page labels may be present in the margin text. Note that the text string may contain all the text of the corresponding page, or may include only portions of the text. Furthermore, the text string may exhibit varying degrees of accuracy with respect to the original text of the printed book.

At 210, the scanning service 116 identifies page numbers or labels associated with each scanned page of the printed book 202. This may be performed based on or in conjunction with OCR procedures and may in some cases be aided by human analysts.

At 212, the scanning service 116 normalizes the page text strings by removing extraneous characters such as non-text data, white space data, formatting data, etc. Normalizing may also include converting all characters to a single case such as lower-case.

The result of the actions above can be output as one or more data objects 214 containing normalized and labeled pages. Data object 214 can comprise a data structure indicating page text strings corresponding to individual pages, along with the page labels associated with those pages.

In some embodiments, the data object 214 may contain the normalized text of the printed book 202, along with page break indications. The pages can be considered to have ordinal page numbers corresponding to their page count as measured from the beginning of the printed book 202. In most cases, ordinal page numbers will not correspond to page labels. This is because many printed books include some pages that are not numbered, or that are numbered using an alternate index prior to the main body of the book. For example, many printed books include front matter such as title pages and tables of contents that are not included in the main page numbering of the books. Some books may also include introductions or forwards that are numbered using an alternate format such as roman numerals, prior to the main body of the book.

The data object 214 may be configured to include a page-to-label mapping, indicating correspondences between ordinal page numbers and actual page labels. A page-to-label mapping may be logically viewed as a table having first and second columns, where one column indicates ordinal page numbers and the other column indicates corresponding page labels. In actual implementation, various schemes may be used to represent this information, including the specification of ranges of ordinal pages. For example, a range of ordinal pages may be listed as having page labels that begin at Roman numeral and that continue in sequence to the end of the range. Another range may be listed as beginning at Arabic page number 1 and continuing in sequence from there.

Some ordinal pages of a printed book may not have corresponding page labels. For example, pages containing illustrations sometimes are not included in the page numbering of a printed book. Pages such as these may be omitted from the page-to-label mapping, or they may be included along with an indication that they do not correspond to a page label. In some cases, the page-to-label mapping may indicate the nature of the ordinal page. For example, the page-to-label mapping may indicate that a particular ordinal page contains an illustration rather than a normally numbered text page.

The electronic book 204 is processed by the pagination service 118 as shown on the right side of FIG. 2. At 216, the electronic book 204 is normalized by removing extraneous characters. This might include the removal of white space characters, punctuation, formatting data, metadata, and other non-displayable data. Remaining characters may also be converted to a single case such as lower-case. This allows the electronic book 204 to be represented as a text string, referred to in the following discussion as book text 218 or as a book text string. The normalization in most cases will be generally the same as the normalization 212 performed on the pages of the printed book 202.

Block 220 represents an action or procedure that is performed for individual pages of the printed book 202. Specifically, for each labeled page of the printed book 202, the pagination service 118 performs an action 222 of finding the corresponding position in the electronic book 204. In the described embodiment, this comprises comparing the text of the labeled page to at least a portion of the electronic book or book text 218 to determine the position of the page within the electronic book. Various methods can be used to determine this position, including string comparisons. One method, using autocorrelation techniques, will be described below with reference to FIG. 3.

FIG. 3 shows an example implementation of a procedure 222 for finding the location of a scanned page within an electronic book. Generally, the procedure 222 comprises, for an individual page of the printed book 202 and its corresponding page string, autocorrelating with at least a portion of the electronic book 204 to determine one or more possible matching positions within the electronic book 204. The procedure 222 then continues by comparing the individual page to the electronic book at each of the identified one or more possible matching positions to find the position at which the page most closely matches the electronic book.

More specifically, the procedure 222 starts with a normalized and labeled page or page string 302, which may be one of the pages of the normalized and labeled pages 214 shown in FIG. 2; and a normalized electronic book or book string 304, which may be the book text 218 shown in FIG. 2.

At 306, the procedure 222 autocorrelates the page string 302 with at least a portion of the book string 304 to determine one or more possible matching positions within the book string 304. Both the page string 302 and the book string are treated as signals having single-bit amplitudes: as sequences of bits. More specifically, characters or bytes of each string are concatenated and then converted to bit strings. The bit signal corresponding to the page string 302 is assumed for purposes of analysis to be a small portion or substring of the bit signal corresponding to the book string 304, and autocorrelation scores are calculated to find best-match positions within the book string 304.

In the described embodiment, the page string 302 is compared to a sliding sequence of character windows or substrings within the book string 304. The character windows or substrings are the same size as the page string 302, and slide incrementally by one character within the book string 304 to produce autocorrelation scores for different possible character positions within the book string 304.

At each window or substring within the book string 304, an autocorrelation score is calculated as a bitwise function or calculation between corresponding bits of the page string 302 and the current sliding window or substring within the book string 304. More specifically, the autocorrelation score at a particular position p within the book string 304 may be calculated by summing the product of individual bit positions of the page string 302 and the current substring within of the book string 304, as follows:

$$\sum_{i=0}^{n-1} b_i * B_{p+i}$$

where $b_i$ is the bit at position i within the page string 302, $B_{p+i}$ is the bit within the book string 304 at position p+i, and n is the number of bits within the page string 302. Because this is a binary, bitwise operation, it can also be described as the sum of the logical ANDing of individual bit positions as follows:

$$\sum_{i=0}^{n-1} b_i AND B_{p+i}$$

The operation above produces autocorrelation scores for different positions within the book string 304. At 308, these scores are analyzed to identify a limited number of potential candidate or matching positions—positions within the book string 304 that are most likely to correspond to the current page string 302. This may be done by selecting the positions having the highest autocorrelation scores, or by selecting those positions whose scores indicate peak matches within the book string 304. Candidate positions for a match positions are indicated in FIG. 3 by reference numeral 310.

In some cases, the autocorrelation 306 may be performed over all possible positions of the book string 304. However, in many cases it is possible to generally approximate the position of a given page within the book string in light of matches that have already been performed. For example, once the position of a page is found with high confidence, subsequent pages can be assumed to have subsequent positions within the book string 304, and the autocorrelation 306 may safely ignore any preceding substrings.

As autocorrelation is being performed at sequential character positions, the pagination system 114 may keep track of the highest few preceding scores, and may not need to keep track of all calculated scores. Furthermore, a very high autocorrelation score may be treated as an exact match. This may remove any need for performing further autocorrelation analyses with respect to the current page string 302.

At 312, further comparison is performed between the page string 302 and the substrings at the candidate positions 310. In some embodiments, this comparison may comprise calculating edit distances from the page string 302 to the substrings at the candidate positions 310. The edit distance between two strings of characters is the number of operations needed to change one of the strings into the other. This may be calculated using different algorithms. In the described embodiment, the edit distances can be calculated as Levenshtein distances.

At 314, the best match is selected from the candidate positions of action 308, by selecting the one with the shortest edit distance.

Returning to FIG. 2, the pagination service 114 uses the results of action 220 to create a page/position map 224, which is equivalent to the page/position map 114 described above with reference to FIG. 1. As described there, the page/position map indicates page numbers or labels derived from the printed book 202, and their corresponding positions within the electronic book 204. Positions within the electronic book 204 can be indicated using various indices, depending on the data format of the electronic book. Some eBook formats may indicate position in terms of a byte or character index, such as the number of bytes or characters from the beginning of the eBook. Other eBook formats may indicate position in terms of a word index, such as the number of words from the beginning of the eBook. Other measurement quantities might also be used, such as a sentence index, a line index, or a paragraph index. In audio books, location or position may be indicated by a time index—the length of elapsed time from the beginning of the audio book.

At 226, the pagination service associates the page/position map 224 with the electronic book 204. Subsequent distributions of the electronic book 204 may include the page/position map 224.

FIG. 4 shows an example 400 of how the electronic reader 104 might utilize the page/position map 114 associated with the electronic book 112. At 402, the electronic reader 104 receives and stores the electronic book 112 and its associated page/position map 114. At 404, a user selects a book navigation function using an available interface on the electronic reader 104. At 406, the electronic reader 104 prompts the user for a page number. At 408, in response to the user entering a page number, the electronic reader references the page/position map 114 to find the position in the electronic book that corresponds to the page number that the user has entered. At 410, the electronic reader navigates to the position found at 408.

FIG. 5 shows another example 500 of how the electronic reader 104 might utilize the page/position map 114 associated with the electronic book 112. At 502, the electronic reader 104 receives and stores the electronic book 112 and its associated page/position map 114. At 504, a user highlights or otherwise selects a passage within the electronic book. At 504, the user navigates to a position within the electronic book, using user interface features of this electronic reader 104. This may involve simply moving from one page to the next, or may involve specifying a particular position or page number within the electronic book 112.

At 506, in response to the user specification of or navigation to a position within the electronic book, the electronic reader references the page/position map 114 to find the page number associated with portion of the electronic book 112 that is currently being shown. At 508, the electronic reader 104 displays the found page number on its display, such as in a header or footer location of the displayed page. This allows the user to see the current page number, correlated with the print version of the electronic book, at any time when navigating within the electronic book.

FIG. 6 shows yet another example 600 of how the electronic reader 104 might utilize the page/position map 114 associated with the electronic book 112. At 602, the electronic reader receives and stores the electronic book 112 and its associated page/position map 114. At 604, a user highlights or otherwise selects a passage or position within the electronic book 112. At 606, the user selects or invokes a passage citation function of the electronic reader 104, using an available user interface on the electronic reader 104. At 608, in response to the user specification of or navigation to a particular position within the electronic book, the electronic reader responds by referencing the page/position map 114 to find the page number associated with the highlighted or selected position of the electronic book. At 610, the electronic reader cites the page label associated with the position that the user has designated, in some cases creating a textual citation using the found page number. This might comprise simply showing the page number to the reader, or might involve a more sophisticated report showing full bibliographic information, including the page number of the citation.

Example Electronic Reader

Figure 7:
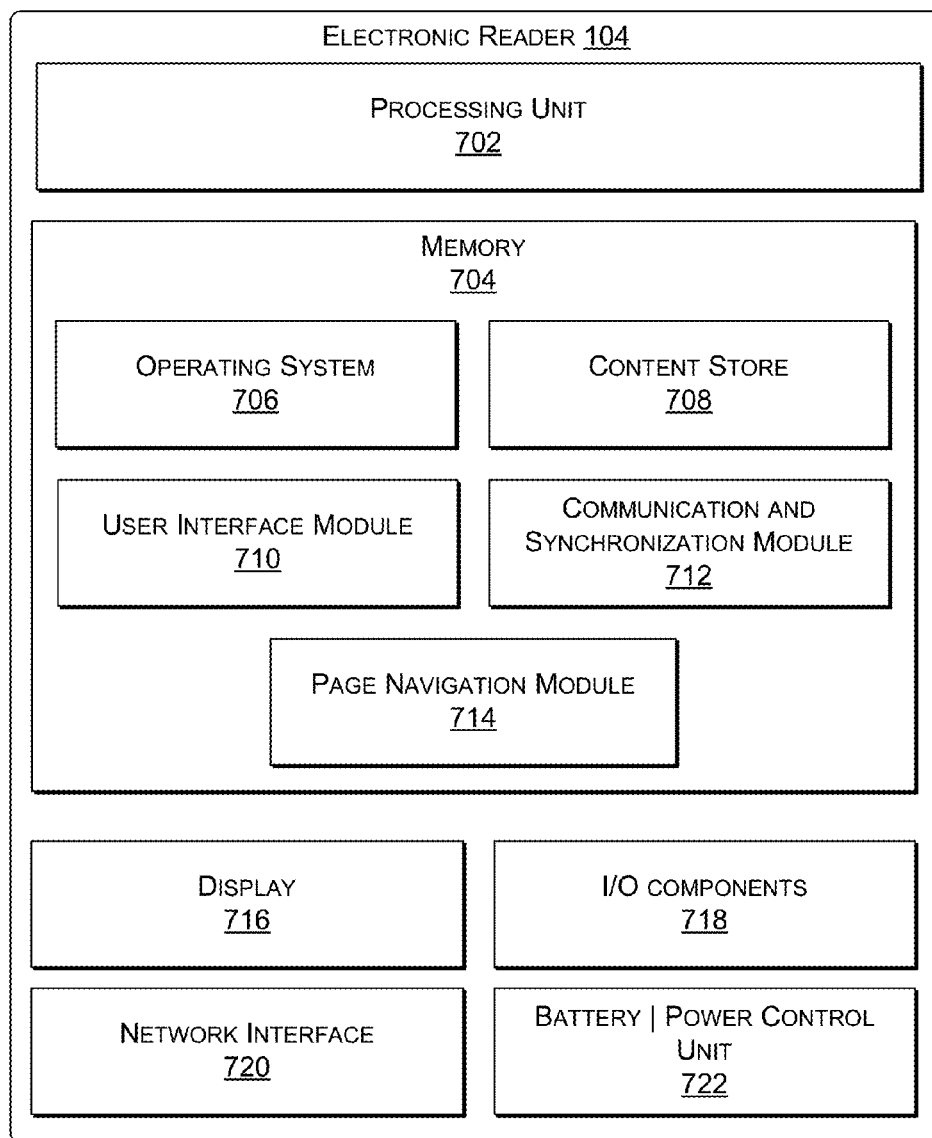
FIG. 7 is a block diagram illustrating components of an electronic book reader device that may be used in conjunction with the techniques described herein.

FIG. 7 is a high-level block diagram showing an example of the electronic reader 104, indicating components that are relevant to this discussion. In this embodiment, the electronic reader 104 is a dedicated eBook reader device, designed specifically for the purpose of emulating a traditional book-like reading experience. To that end, it is has a size and weight that is comparable to a paper-based book, and uses a display having a contrast ratio that approaches that of the printed page.

In a very basic configuration, the electronic reader 104 includes a processing unit 702 composed of one or more processors, and memory 704. Depending on the configuration of the eBook reader 104, the memory 704 may be a type of computer storage media and may include volatile and non-volatile memory. Thus, the memory 704 may include, but is not limited to, RAM, ROM, EEPROM, flash memory, or other memory technology, or any other medium which can be used to store media items or applications and data which can be accessed by the electronic reader 104.

The memory 704 may be used to store any number of functional components that are executable on the processing unit 702. In many embodiments, these functional components comprise instructions or programs that are executable by the processing unit 702, and that implement operational logic for performing the actions attributed above to the electronic reader 104. In addition, the memory 704 may store various types of data that are referenced by executable programs.

The memory 704 may store an operating system 706 and a content store 708 to store one or more content items and their associated page/position maps. A user interface module 710 may also be provided in the memory 704 and executed on the processing unit 702 to provide for user operation of the electronic reader 104. The UI module 710 may provide menus and other navigational tools to facilitate selection and rendering of content items. The UI module 710 may further include a browser or other application that facilitates access to sites over a network, such as websites or online merchants, or other sources of electronic content items or other products.

A communication and synchronization module 712 is stored in the memory 704 and executed on the processing unit 702 to perform management functions in conjunction with one or more content sources, such as the content service 108 discussed above. In some embodiments, the communication and synchronization module 712 communicates with the content service 108 to receive eBooks, page/position maps, and other data.

The electronic reader 104 may also include a page navigation module 714 allowing a user to enter navigate within an electronic book with reference to page numbers or labels rather than byte or character positions, in accordance with the techniques described above.

The electronic reader 104 may further include a display 716 upon which electronic books are rendered. In one implementation, the display 718 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 104 may further be equipped with various input/output (I/O) components 718. Such components may include various user interface controls (e.g., buttons, joystick, keyboard, etc.), audio speaker, connection ports, and so forth.

A network interface 720 may support both wired and wireless connection to various networks, such as cellular networks, radio, WiFi networks, short range networks (e.g., Bluetooth), IR, and so forth. The network interface 720 facilitates receiving electronic books and other content as described herein.

The electronic reader 104 may also include a battery and power control unit 722. The power control unit operatively controls an amount of power, or electrical energy, consumed by the electronic reader. Actively controlling the amount of power consumed by the electronic reader may achieve more efficient use of electrical energy stored by the battery.

The electronic reader 104 may have additional features or functionality. For example, the electronic reader 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example Server

Figure 8:
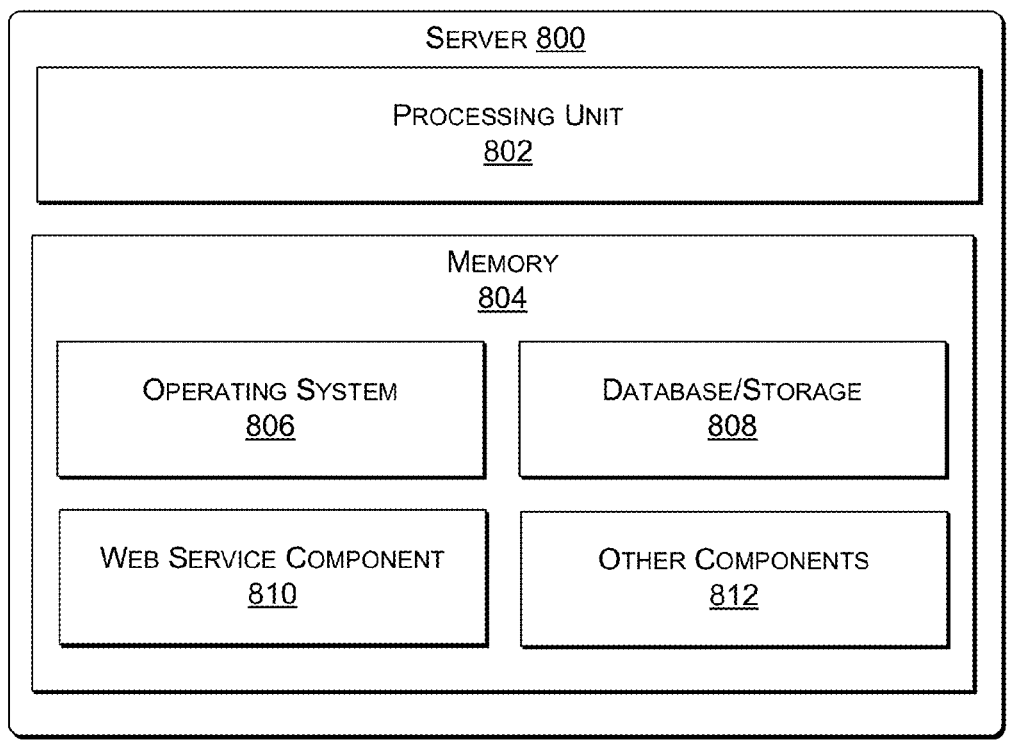
FIG. 8 is a block diagram illustrating components of a server that may be used to implement some of the techniques described herein.

FIG. 8 illustrates relevant components of a server 800 that may be used to implement the functionality of the content service 108 and/or its various components. Generally, the content service 108 and its services may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 800 may comprise a processing unit 802 composed of one or more processors, and memory 804. Depending on the configuration of the server 800, the memory 804 may be a type of computer storage media and may include volatile and nonvolatile memory. Thus, the memory 804 may include, but is not limited to, RAM, ROM, EEPROM, flash memory, or other memory technology.

The memory 804 may be used to store any number of functional components that are executable by the processing unit 802. In many embodiments, these functional components comprise instructions or programs that are executable by the processing unit 802, and that when executed implement operational logic for performing the actions attributed above to the content service 108. In addition, the memory 804 may store various types of data that are referenced by executable programs, including content items that are supplied to consuming devices such as electronic reader 104.

Functional components stored in the memory 804 may include an operating system 806 and a database 808 to store content items, annotations, page/position maps, etc. Functional components of the server 800 may also comprise a web service component 810 that interacts with remote devices such as computers and media consumption devices.

The server 800 may of course include many other logical, programmatic, and physical components, generally referenced by numeral 812, possibly including modules for implanting the functionality described above and attributed to the content service 110, the scanning service 116, and/or the pagination service 118.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A computer-implemented method of paginating an electronic book, the method comprising:
   under control of one or more processors configured with executable instructions,
   capturing images of pages of a print version of the electronic book;
   performing optical character recognition on the images;
   based at least in part on the optical character recognition, identifying page text strings and associated page labels corresponding to individual pages;
   for an individual page text string, autocorrelating with at least a portion of the electronic book to determine a plurality of candidate matching positions within the electronic book;
   at each respective candidate matching position within the electronic book, comparing the individual page text string to a respective text string of the electronic book corresponding to the respective candidate matching position determined from the autocorrelating;
   selecting a page position from the plurality of candidate matching positions based at least in part on the comparing; and
   mapping between the selected page position and the page label associated with the individual page text string.

2. The computer-implemented method of claim 1, wherein the mapping further comprises:
   creating a page/position map that indicates correspondences between page labels of the print version and positions within the electronic book; and
   associating the page/position map with the electronic book.

3. The computer-implemented method of claim 1, further comprising normalizing the page text strings and text of the electronic book before the autocorrelating, wherein the normalizing comprises at least one of:
   removing extraneous characters; or
   converting characters to a single case.

4. The computer-implemented method of claim 1, wherein the comparing is based at least in part on edit distance.

5. The computer-implemented method of claim 1, wherein the autocorrelating comprises performing a bitwise calculation.

6. The computer-implemented method of claim 1, wherein the autocorrelating comprises summing a product of individual bit positions.

7. A computer-implemented method comprising:
   under control of one or more processors configured with executable instructions,
   performing machine-based optical character recognition on individual pages of a print version of a book to obtain page labels and page text from the individual pages;
   finding positions within an electronic version of the book that correspond to individual pages of the print version, wherein the finding is based at least in part on:
      autocorrelation between the page text and the electronic version to identify a plurality of candidate positions for respective ones of the individual pages, and
      comparing the page text and text of the electronic version at the plurality of candidate positions to select found positions from the plurality of candidate positions determined from the autocorrelation; and
   associating the found positions within the electronic version with the page labels of the corresponding individual pages of the print version.

8. The computer-implemented method of claim 7, wherein the associating comprises:
   creating a page/position map that indicates correspondences between page labels of the print version and positions within the electronic version; and
   associating the page/position map with the electronic version.

9. The computer-implemented method of claim 7, wherein the associating comprises revising the electronic book to indicate page numbering.

10. The computer-implemented method of claim 7, wherein the autocorrelation comprises summing products of individual bit positions of the page text and at least a portion of the electronic version.

11. The computer-implemented method of claim 7, wherein the finding is further based at least in part on edit distances between the page text and the electronic version.

12. The computer-implemented method of claim 7, further comprising, in response to user entry of a page number, navigating to a corresponding position within the electronic version based at least in part on the associating.

13. The computer-implemented method of claim 7, further comprising, in response to user specification of a particular position within the electronic version, citing the page label associated with the particular position based at least in part on the associating.

14. The computer-implemented method of claim 7, further comprising:
- creating a page/position map table that indicates correspondences between page labels of the print version and positions within the electronic version; and
- in response to user entry of a page number, referencing the page/position map table to find the corresponding position within the electronic version.

15. The computer-implemented method of claim 7, further comprising:
- creating a page/position map table that indicates correspondences between page labels of the print version and positions within the electronic version; and
- in response to user specification of a particular position within the electronic version, referencing the page/position map table to find the corresponding page of the print version.

16. A system comprising:
- one or more processors;
- one or more computer-readable media containing instructions that are executable by the one or more processors to perform actions comprising:
  - obtaining page text and corresponding page labels from individual pages of a print version of a book;
  - determining a page-to-label mapping between the individual pages and the page labels obtained from the print version;
  - comparing the page text of the individual pages to an electronic version of the book to determine the positions of the individual pages within the electronic version;
  - creating, based at least in part on the comparing and the page-to-label mapping, a page/position map as a data object separate from content of the electronic version, wherein the page/position map indicates correspondences between the page labels obtained from the print version and positions within the electronic version; and
  - paginating the electronic version in accordance with the comparing.

17. The system of claim 16, wherein the page labels obtained from the print version comprise at least two different types of page labels.

18. The system of claim 16, wherein the comparing comprises:
- performing autocorrelation to identify a plurality of candidate matching positions for the page of text;
- calculating edit distances between the page of text and substrings corresponding to the candidate matching positions; and
- selecting one of the candidate matching positions as the matching position based at least in part on the edit distances.

19. The system of claim 16, wherein the obtaining comprises machine-based optical character recognition.

20. The system of claim 16, wherein the positions within the page/position map are expressed as at least one of:
- a number of bytes from a beginning of the electronic version;
- a number of characters from the beginning of the electronic version; or
- a number of words from the beginning of the electronic version.

21. A computer-implemented method comprising:
- under control of one or more processors configured with executable instructions,
- autocorrelating a first character string against substrings at different positions within a second character string to produce autocorrelation scores corresponding to the substrings;
- selecting a matching position within the second character string based at least in part on the autocorrelation scores corresponding to the substrings, the matching position corresponding to a first substring of the substrings; and
- subsequent to autocorrelating the first character string, autocorrelating a third character string against the substrings of the second character string, wherein at least one of the substrings is at a position within the second character string that is prior to the matching position of the first substring.

22. The computer-implemented method of claim 21, wherein autocorrelating the first character string against a particular substring comprises summing bitwise products of the first character string and the particular substring.

23. The computer-implemented method of claim 21, wherein autocorrelating the first character string against a particular substring comprises:
- bitwise ANDing the first character string and the particular substring to produce bitwise results; and
- summing the bitwise results.

24. The computer-implemented method of claim 21, further comprising normalizing the first character string and the second character string before the autocorrelating.

25. The computer-implemented method of claim 21, wherein the selecting is further based at least in part on calculating edit distances between the first character string and the substrings.

26. The computer-implemented method of claim 21, wherein the selecting further comprises:
- identifying a plurality of candidate matching positions based at least in part on the autocorrelating;
- calculating edit distances between the first character string and each of the substrings corresponding to the candidate matching positions; and
- selecting one of the candidate matching positions as the matching position based at least in part on the calculated edit distances.

27. A method comprising:
- determining, by one or more processors, page text corresponding to individual pages of a print version of a book;
- determining, by the one or more processors, page labels included on the individual pages of the print version;
- determining, by the one or more processors, a page-to-label mapping between the individual pages and the page labels from the print version;
- determining, by the one or more processors, positions within an electronic version of the book that correspond to the individual pages of the print version, wherein the determining is based at least in part on comparing the page text of the individual pages of the print version to text of the electronic version; and generating, by the one or more processors, based at least in part on the page-to-label mapping and the comparing, a page/position map, wherein the page/position map indicates correspondences between the page labels from the print version of the book and the positions within the electronic version of the book.

28. The method of claim 27, further comprising based at least in part upon the page/position map, revising content of the electronic book to indicate page numbering corresponding to the page labels from the print version.

29. The method of claim 27, further comprising:
generating the page/position map as a data object separate from content of the electronic version of the book; and
sending the page/position map to a user device, wherein in response to user entry of a page label, the page/position map is configured to indicate a corresponding position within the electronic version.

\* \* \* \* \*